Jan. 25, 1955  A. RONNING  2,700,550
TRACTOR VEHICLE AND STEERABLE WHEEL SUSPENSION THEREFOR
Filed Dec. 29, 1950  2 Sheets-Sheet 1
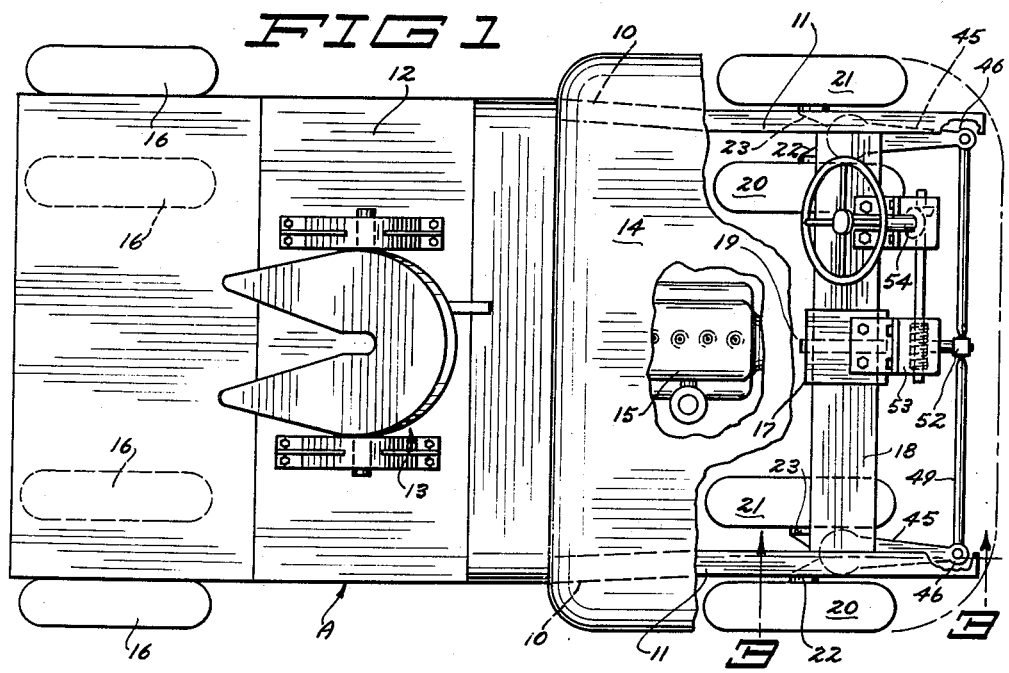
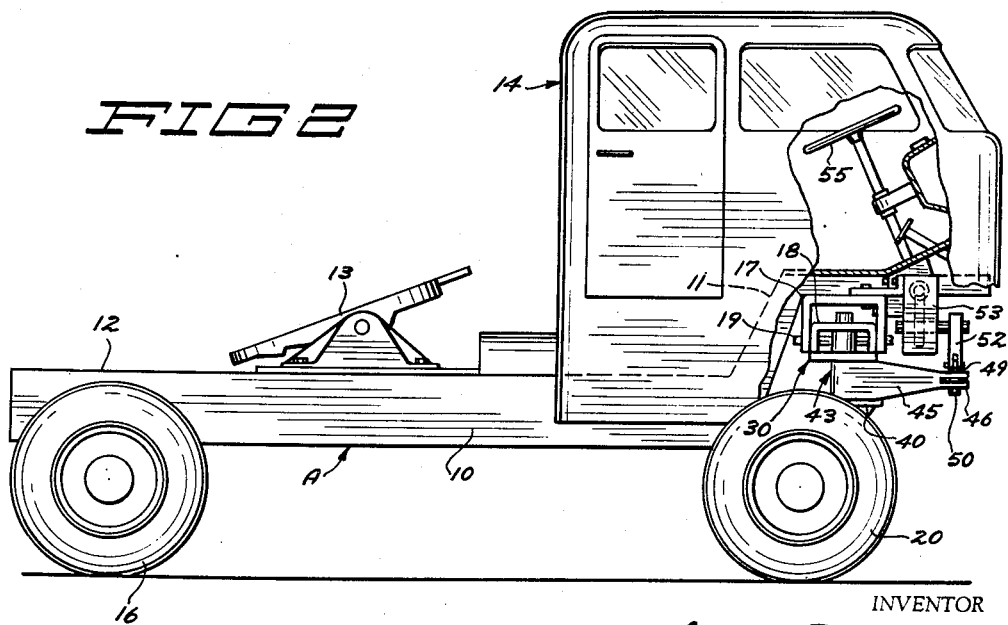
INVENTOR
ADOLPH RONNING
BY Carlsen + Hazle
ATTORNEYS Jan. 25, 1955 A. RONNING 2,700,550
TRACTOR VEHICLE AND STEERABLE WHEEL SUSPENSION THEREFOR
Filed Dec. 29, 1950 2 Sheets-Sheet 2
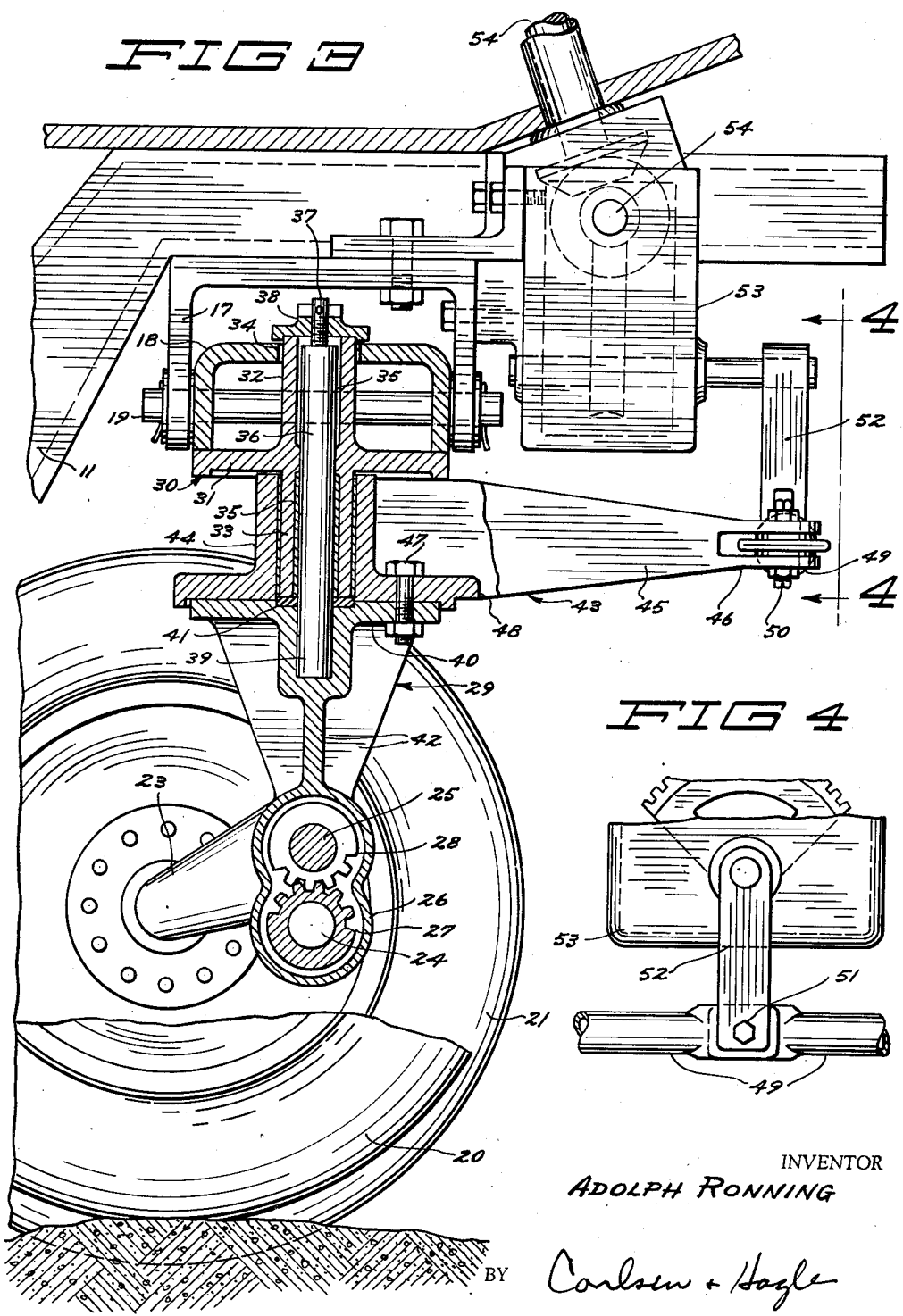
INVENTOR
ADOLPH RONNING
BY Carlsen + Hogle
ATTORNEYS

United States Patent Office 2,700,550
Patented Jan. 25, 1955

2,700,550

TRACTOR VEHICLE AND STEERABLE WHEEL SUSPENSION THEREFOR

Adolph Ronning, Minneapolis, Minn.

Application December 29, 1950, Serial No. 203,484

2 Claims. (Cl. 280—95)

This invention relates generally to improvements in wheel suspensions or mountings for vehicles and more particularly to wheel suspension and load distribution arrangements for tractor vehicles of the types used in connection with heavy duty semi-trailers, for motor busses and other heavy vehicles.

The primary object of my present invention is to provide an improved steerable front wheel suspension for vehicles of this class, with differentially connected wheel pairs, similar to that shown in my co-pending application Serial No. 26,203, filed May 10, 1948, which issued August 25, 1953, as Patent No. 2,650,100, for Steerable Trailer Front Wheel Mechanism, of which this application constitutes a continuation-in-part; said wheels being four in number and so arranged as to each carry its full proportionate share of the load, without overloading the tires or interfering with steering movements. Still another object is to provide in a self-propelled vehicle for pulling semi-trailers a construction such as to bring the load forces forward, as compared to the usual semi-trailer tractor, to more evenly distribute the load to all wheels with the result that heavier loads may be carried without overloading the tires, and with the load so distributed as to minimize the injurious effect to the road surface now so prevalent with the customary heavy duty vehicles.

These and other more detailed and specific objects will be disclosed in the course of the following specification, reference being had to the accompanying drawings, in which—

Fig. 1 is a plan view of a vehicle according to my invention, portions thereof being broken away to disclose constructional features.

Fig. 2 is a side elevation, also with portions broken away and shown in section.

Fig. 3 is a greatly enlarged, vertical and longitudinal sectional view, taken substantially along the line 3—3 in Fig. 1, showing one of the front wheel suspension assemblies.

Fig. 4 is a detail elevational view of the steering connection, as viewed along the line 4—4 in Fig. 3.

Referring now more particularly and by reference characters to the drawing, A designates generally the chassis frame of the vehicle according to my present invention, same comprising forwardly and rearwardly extending frame base 10 with forward gooseneck ends 11 and joined by a suitably rigidly braced platform 12 whereon is mounted a conventional fifth wheel 13 for the support and connection of a semi-trailer (not shown). Surmounting the forward portion of this chassis frame is an operator's cab 14 and the usual internal combustion engine 15 is also arranged close to the forward end, below the cab, and is conventionally connected to drive traction wheels 16, here shown as being four in number and located at the rear of the frame.

The gooseneck formation 11 of the front end of the frame provides space therebeneath for transversely spaced, steerable and differentially connected front wheel pairs, the general location, support and steering of which is similar to that shown in my co-pending application earlier identified herein. Centrally located beneath the forward end of the frame is an inverted U-shaped bracket 17 and a transversely extending oscillating axle or bolster 18 is pivoted at its center in this bracket upon a forwardly and rearwardly extending pin 19 whereby the ends of the bolster may swing upwardly and downwardly. Located beneath each end of the bolster is an identical differential wheel pair, the two pneumatic tired, close spaced wheels of which are designated at 20 and 21. Since these assemblies are identical one will be described in detail and corresponding parts of each designated by the same reference characters.

Referring particularly to Figs. 1 and 3, the wheels 20—21 are journaled at the rear ends of cranked axles 22—23 the forward journal ends 24—25 of which are journaled transversely and in vertically spaced relation through a gear housing or case, indicated at 26. Interiorly of this housing the journal ends of the axles 22—23 are provided with meshing gears 27—28 (Fig. 3) and thus the upward swinging motion of either axle, as its wheel travels an irregularity in the road surface, will be translated to an equal and opposite motion of the other with a differential, compensating effect.

Each differential wheel pair is supportably connected to the corresponding end of the bolster 18 by two main elements or parts, respectively rotatable and non-rotatable, and designated generally at 29 and 30. The non-rotatable element 30 has a circular cap plate 31, and upwardly and downwardly extending bearing sleeves 32—33, and this element is welded or otherwise firmly affixed to the bolster 18, with the upper bearing sleeve 32 extending up through an opening 34 in the bolster. Bushings 35 in these bearing sleeves journal an upright king pin 36 which has a reduced, threaded upper end 37 on which a castellated cap nut 38 is screwed down on the upper end of sleeve 32. At its lower end the king pin depends well below sleeve 33 and is press fitted or otherwise secured in a socket 39 in the rotatable element 29, thus providing for steering movements about the latter on a vertical axis. Said element 29 has an upper load carrying plate 40 and a thrust bearing 41 bears against the lower end of sleeve 33 to transmit the load while permitting such steering movements. A downward, suitably ribbed and stiffened extension 42 connects plate 40 to the housing 26. Completing the assembly is a steering element, designated generally at 43, having a rear collar portion 44, surrounding the lower bearing sleeve 33 and journaled by a bushing thereon, and a forwardly directed steering arm 45 bifurcated at its forward end 46. In my previous application Serial No. 26,203 this element 43 was selectively securable to the rotatable and non-rotatable elements 29 and 30, but here element 43 is firmly secured to element 29 as by means of a bolt 47 through the plate 40, and a dust skirt plate 48 forming part of the collar 44. A comparison of the structures of the previous and present applications will make apparent the similarity and interchangeability of the parts.

In the normal position, for straightahead travel of the vehicle, the steering arms 45 extend straight forwardly and they are joined by transversely extending steering rods 49, the outer ends of which are pivotally attached at 50 to the bifurcated ends 46 of the arms. Any suitable provision is made for moving these steering rods 49 in transverse directions for steering the wheel assemblies and as here shown the inner ends of the rods are centrally connected at 51 to a crank 52 operated from a worm and sector in a gear box 53 secured to the vehicle frame, with bevel gear connected shafts 54 leading to a steering wheel 55 in the cab 14. The usual motions of this steering wheel 55 will be transmitted through the shifting and gearing to the rods 49 to swing the steering arms 45 in horizontal planes, turn the members 29 about the axes of the king pins 36 and thus correspondingly steer the wheel pairs, without interfering with either the differential motion of the individual wheels 20—21 or the transverse rocking motion of the bolster 18.

It will thus be apparent that I have provided a four wheel steerable forward suspension with differential accommodation such as to distribute the load equally to each wheel so that a greater proportion of the overall load may be placed upon the front end without overloading the tires, and with maximum dispersion of the load over the road surface. Advantage is taken of this new load distribution by placing the cab and engine over the front wheels and particularly by locating the fifth wheel 13 well forward, and ahead of the rear wheels 16. Thus the front end load of the semi-trailer is brought to bear between the front and rear wheels of the tractor and this has numerous advantages not only in road performance of the combination but in load distribution to all of the wheels involved, both tractor and trailer.

It is to be noted that the differential connection of the wheel pairs 20—21 is vital to proper steering and load distribution and that close spaced wheels with stiff axle connections would not be practical from these standpoints.

It is to be further particularly noted that the transversely aligned rotation axes of each pair of wheels 20-21 are disposed substantially rearwardly of the journal ends 24—25 of the cranked axles 22—23 and whose centers are normally substantially in the vertical plane of the vertical steering axis. This construction provides a caster effect and renders steering easier under heavy loads which vehicles of the character disclosed usually carry. The leverage necessary for easy steering is also augmented by the provision of the steering arms 45 which extend forwardly of the journal ends 24—25 in general parallelism with the cranked axles.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A steerable front wheel suspension for a heavy duty vehicle having a frame and rear supporting wheels, comprising a bolster member disposed transversely of the frame adjacent the front end thereof, means pivoting said bolster member at a central point thereof to the frame for swinging movements about a longitudinal horizontal axis, a vertical bearing support adjacent each end of the bolster, an upright member mounted in each bearing support for rotation about a vertical axis, a housing supported by the lower end of each of said uprights in symmetrical relation to said axis, a pair of cranked axles having the forward ends thereof journaled in each housing, a pair of wheels rotatably journaled on the rear ends of said axles at opposite sides of the housing on axes transverse to and rearwardly of said first axis, means in said housing differentially connecting said axles whereby upward movement of either wheel will cause downward movement of the other wheel, steering arms connected to said upright members and steering mechanism connected to said arms.

2. A steerable front wheel suspension for a heavy duty vehicle having a frame and rear supporting wheels, comprising a bolster member disposed transversely of the frame adjacent the front end thereof, means pivoting said bolster member at a central point thereof to the frame for swinging movements about a longitudinal horizontal axis, a vertical bearing support adjacent each end of the bolster, an upright member mounted in each bearing support for rotation about a vertical axis, a housing supported by the lower end of each of said uprights in symmetrical relation to said axis, a pair of cranked axles having the forward ends thereof journaled in each housing, a pair of wheels rotatably journaled on the rear ends of said axles at opposite sides of the housing on axes transverse to and rearwardly of said first axis, means in said housing differentially connecting said axles whereby upward movement of either wheel will cause downward movement of the other wheel, steering arms connected to said upright members, said steering arms extending forwardly of the vertical axes of said upright members in general parallelism with said cranked axles, and steering mechanism connected to said arms.

References Cited in the file of this patent
UNITED STATES PATENTS

| Number | Name | Date |
|---|---|---|
| 1,095,127 | Senderling | Apr. 28, 1914 |
| 1,162,418 | Uhlrig | Nov. 30, 1915 |
| 2,178,505 | Warneke | Oct. 31, 1939 |
| 2,217,816 | Ronning | Oct. 15, 1940 |
| 2,238,615 | Wolf | Apr. 15, 1941 |
| 2,242,454 | Cochran | May 20, 1941 |
| 2,277,197 | Ash | Mar. 24, 1942 |
| 2,444,025 | Austin | June 29, 1948 |
| 2,528,277 | Humes et al. | Oct. 31, 1950 |